UNITED STATES PATENT OFFICE.

WILLIAM FITZGERALD, OF INDIAN ORCHARD, MASSACHUSETTS.

COMPOSITION OF MATTER USED IN CLEANING AND POLISHING METALS.

SPECIFICATION forming part of Letters Patent No. 621,053, dated March 14, 1899.

Application filed September 23, 1898. Serial No. 691,713. (Specimens.)

*To all whom it may concern:*

Be it known that I, WILLIAM FITZGERALD, a citizen of the United States of America, residing at Indian Orchard, in the county of Hampden and State of Massachusetts, have invented a new and useful Composition of Matter to be Used in Cleaning and Polishing Metals, of which the following is a specification.

My composition consists of the following ingredients combined in the proportions stated, viz: paris-whiting, ten pounds; Prussian blue, fifty grains; chrome-orange, one hundred and fifty grains.

The sesquioxids of iron and the silica and alumina contained in the Prussian blue, together with the chemical effect of the chromate in the chrome-orange, combined with the paris-white, are found to conduce to the quick removal of all dullness from polished gold and silver surfaces without leaving any trace of abrasion thereon, and the composition is also good for brass surfaces, the chemical effect of the composition being to hasten the removal of dull colors when combined, as aforesaid, with paris-white, and the colors of the Prussian-blue and chromate-orange incidentally serve to impart an agreeable color to the composition, which for use is ordinarily pressed into cakes of convenient form and size, or it may be put up in powdered form in boxes.

This composition is applied to metals for cleaning and polishing them by moistening a soft piece of cloth with water and sprinkling or rubbing the powder onto the cloth and with the latter applying the powder to the article to be cleansed and polished.

Having thus described my invention, what I claim, and desire to secure by Letters Patent, is—

The within-described metal-cleaning substance consisting of paris-whiting, Prussian blue, and chrome-orange, combined in substantially the proportions hereinbefore set forth.

WM. FITZGERALD.

Witnesses:
 H. A. CHAPIN,
 K. I. CLEMONS.